US010142824B2

(12) United States Patent
Hagihara et al.

(10) Patent No.: US 10,142,824 B2
(45) Date of Patent: Nov. 27, 2018

(54) COMMUNICATION SYSTEM INSTALLED IN A VEHICLE

(71) Applicant: HONDA MOTOR CO., LTD., Tokyo (JP)

(72) Inventors: Tomoya Hagihara, Wako (JP); Arata Isobe, Wako (JP); Fuyuto Takeyama, Wako (JP); Yosuke Shimizu, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/654,141

(22) Filed: Jul. 19, 2017

(65) Prior Publication Data

US 2018/0027367 A1 Jan. 25, 2018

(30) Foreign Application Priority Data

Jul. 20, 2016 (JP) .................... 2016-142841

(51) Int. Cl.
| | |
|---|---|
| *H04W 4/30* | (2018.01) |
| *H04W 4/80* | (2018.01) |
| *B60R 11/02* | (2006.01) |
| *H04M 1/60* | (2006.01) |
| *H04W 4/00* | (2018.01) |

(52) U.S. Cl.
CPC ........... *H04W 4/80* (2018.02); *H04M 1/6091* (2013.01); *H04W 4/00* (2013.01)

(58) Field of Classification Search
CPC ...... B60R 11/02; B60R 11/0241; H04W 4/00; H04W 4/30; H04W 4/40; H04W 4/80; H04W 8/22
See application file for complete search history.

(56) References Cited

U.S. PATENT DOCUMENTS

| | | | | |
|---|---|---|---|---|
| 2008/0284198 | A1* | 11/2008 | Ryu | ..................... B60R 11/0235 296/70 |
| 2014/0142783 | A1* | 5/2014 | Grimm | ................... G06F 17/00 701/2 |
| 2016/0280149 | A1* | 9/2016 | Nakano | ............... B60R 11/0235 |

FOREIGN PATENT DOCUMENTS

| | | |
|---|---|---|
| JP | 2010-149532 A | 7/2010 |
| JP | 2012-245953 A | 12/2012 |
| JP | 2014-33534 A | 2/2014 |

OTHER PUBLICATIONS

Office Action dated Mar. 6, 2018, issued in counterpart Japanese Application No. 2016-142841, with English machine translation. (6 pages).

* cited by examiner

*Primary Examiner* — Blane Jackson
(74) *Attorney, Agent, or Firm* — Westerman, Hattori, Daniels & Adrian, LLP

(57) ABSTRACT

A communication system 20 includes a short-range wireless communication device 45 installed in a vehicle 10. The short-range wireless communication device 45 is a device capable of performing short-range wireless communication with a portable communication terminal 46. The short-range wireless communication device 45 is provided in the vicinity of a surface 12c of an instrument panel 12. A first groove portion 35 and a second groove portion 36 are formed in the surface 12c of the instrument panel 12, in the vicinity of the short-range wireless communication device 45.

9 Claims, 7 Drawing Sheets

COMMUNICATION SYSTEM INSTALLED IN A VEHICLE

CROSS-REFERENCE OF RELATED APPLICATION

This application claims priority of Japanese Patent Application No. 2016-142841 filed in Japan on Jul. 20, 2016, the entire contents of which are incorporated herein by reference.

TECHNICAL FIELD

The present invention relates to a communication system.

BACKGROUND OF THE INVENTION

A conventional communication system has been known in which a short-range wireless communication device is installed in a vehicle, and settings of onboard equipment in the short-range wireless communication device are adjusted by use of an occupant's portable communication terminal. In this communication system, the short-range wireless communication device and the portable communication terminal need to be authenticated by short-range wireless communication. Specifically, the portable communication terminal is held close to an NFC (Near field Communication) antenna of the short-range wireless communication device, and the short-range wireless communication device and the portable communication terminal are authenticated by short-range wireless communication (see Japanese Patent Application Publication No. 2014-33534, for example).

SUMMARY OF THE INVENTION

For authentication of the short-range wireless communication device and the portable communication terminal, the occupant needs to grip the portable communication terminal and hold it close to the NFC antenna. However, fingertips of the hand gripping the portable communication terminal protrude from the portable communication terminal. Since the fingertips of the hand hit against an interior surface of the vehicle, it is difficult to hold the portable communication terminal close to the NFC antenna.

The portable communication terminal may be gripped by fingertips to be held close to the NFC antenna (i.e., short-range wireless communication device). However, if the portable communication terminal is gripped by fingertips, it may be difficult to maintain a firm grip of the portable communication terminal. Hence, the portable communication terminal may slip from the hand.

In view of the foregoing, the invention provides a communication system that allows a portable communication terminal to be kept firmly gripped when the portable communication terminal is held close to a short-range wireless communication device.

To solve the above problem, according to a first embodiment of the present invention, a communication system (e.g., communication system 20 of embodiment) installed in a vehicle (e.g., vehicle 10 of embodiment) includes a short-range wireless communication device (e.g., short-range wireless communication device 45 of embodiment) capable of performing short-range wireless communication with a portable communication terminal (e.g., portable communication terminal 46 of embodiment) where the portable communication terminal is brought and held by a user in front of the short-range wireless communication device in such a manner that they are faced to each other and close enough to perform the wireless communication. The short-range wireless communication device is installed in the instrument panel of the vehicle such that an outer periphery of the short-range wireless communication device is in the vicinity of an outer surface edge or periphery (e.g., surface 12c of embodiment) of an instrument panel (e.g., instrument panel 12 of embodiment); and the instrument panel forms a groove portion (e.g., groove portions 31 of embodiment) extending on the outer surface edge or periphery of the instrument panel, which is in the vicinity of the short-range wireless communication device.

As described above, the groove portion is provided on the surface edge or periphery of the instrument panel and in the vicinity of the periphery of the short-range wireless communication device, whereby the groove portion is preferably positioned along a periphery of the portable communication terminal being held by the user's hand in front of the short-range wireless communication device. Hence, fingertips of the hand gripping the periphery of the portable communication terminal can be inserted into the groove portion when holding the portable communication terminal close to the short-range wireless communication device for authentication. That is, it is possible to hold the portable communication terminal close to the short-range wireless communication device with the fingertips of the hand protruding from the portable communication terminal.

This allows the portable communication terminal to be kept firmly gripped, when the portable communication terminal is held close to the short-range wireless communication device. Accordingly, the portable communication terminal can be kept from slipping from the hand.

According to a second embodiment of the invention, the groove portion is formed in a position sandwiching the short-range wireless communication device.

When holding the portable communication terminal by the hand for authentication, one edge of the portable communication terminal may be held by the thumb, and the other edge may be held by the other fingers. In this case, the thumb is located in a relatively high position on the one edge. Of the other fingers, the index finger is located in a relatively high position on the other edge, while the little finger and ring finger are located in relatively low positions on the other edge.

Hence, in the second embodiment, the groove portion is formed in a position sandwiching the short-range wireless communication device. Accordingly, when authenticating by holding the portable communication terminal close to the short-range wireless communication device, the thumb and index finger can be inserted into one groove portion sandwiching the short-range wireless communication device. Also, the little finger and ring finger can be inserted into the other groove portion sandwiching the short-range wireless communication device.

Alternatively, depending on the position of the portable communication terminal when being held close to the short-range wireless communication device, the thumb can be inserted into one groove portion sandwiching the short-range wireless communication device, while the index finger, middle finger, ring finger, and little finger can be inserted into the other groove portion sandwiching the short-range wireless communication device.

Thus, a firm grip of the portable communication terminal can be maintained, and the portable communication terminal can be kept from slipping from the hand.

According to a third embodiment of the invention, the groove portion is formed such that it surrounds the short-range wireless communication device.

Hence, fingers can be inserted into the groove portions when the portable communication terminal is authenticated at an arbitrary angle (specifically, an angle arbitrarily selected from a 360° range). This enables authentication of the portable communication terminal at an arbitrary angle, whereby the communication system can be made more useful.

According to a fourth embodiment of the invention, the groove portion is formed of a first groove portion (e.g., first groove portion 35 of embodiment) and a second groove portion (e.g., second groove portion 36 of embodiment); and the first groove portion and the second groove portion are arranged substantially parallel to each other in the vicinity of the short-range wireless communication device.

As described above, the first groove portion and the second groove portion of the groove portion are arranged substantially parallel to each other. Hence, the first groove portion 35 and the second groove portion 36 can be formed relatively long. With this, the fingertips of the hand gripping the portable communication terminal can be easily inserted into the groove portions, when authenticating by holding the portable communication terminal close to the short-range wireless communication device.

According to a fifth embodiment of the invention, the groove portion is formed of a first groove portion and a second groove portion; the instrument panel is formed at least of a first instrument panel member (e.g., first instrument panel member 25 of embodiment), a second instrument panel member (e.g., second instrument panel member 26 of embodiment) in contact with the first instrument panel member, and a third instrument panel member (e.g., third instrument panel member 27 of embodiment) in contact with the second instrument panel member; the first groove portion is formed at a border (e.g., first border 38 of embodiment) between the first instrument panel member and the second instrument panel member; and the second groove portion is formed at a border (e.g., second border 39 of embodiment) between the second instrument panel member and the third instrument panel member.

As described above, the instrument panel is separated into three members including the first instrument panel member, the second instrument panel member, and the third instrument panel member. The borders among the three members are used to form the first groove portion and the second groove portion. Thus, the complex shape of the instrument panel including the groove portions can be formed easily.

According to a sixth embodiment of the invention, the short-range wireless communication device is provided on a passenger's seat (e.g., passenger's seat 18 of embodiment) side in a width direction of the vehicle.

Hence, the short-range wireless communication device can be provided in a position favorably spaced apart from the driver's seat. This can prevent the driver from erroneously holding the portable communication terminal close to the short-range wireless communication device. That is, it is possible to prevent the driver from erroneously starting authentication.

According to a seventh embodiment of the invention, the short-range wireless communication device has a transceiver portion (e.g., transceiver portion 48 of embodiment) that transmits and receives short-range wireless communication signals, and a connector portion (e.g., connector portion 49 of embodiment) for connecting with an onboard device (e.g., onboard device 51 of embodiment); and the transceiver portion is directed toward a driver's seat (e.g., driver's seat 16 of embodiment) side in the width direction of the vehicle, while the connector portion is directed toward the passenger's seat side in the width direction of the vehicle.

As described above, the transceiver portion of the short-range wireless communication device is directed toward the driver's seat side. Hence, the transceiver portion can be provided in a position favorably close to the driver's seat. This allows the driver to easily hold the portable communication terminal close to the transceiver portion, without overstretching an arm (i.e., within the shortest possible reach).

EFFECT OF THE INVENTION

According to the embodiments of the invention, fingertips of the hand gripping a portable communication terminal can be inserted into a groove portion. Hence, the portable communication terminal can be held close to a short-range wireless communication device with the fingertips of the hand protruding from the portable communication terminal.

This allows the portable communication terminal to be kept firmly gripped when the portable communication terminal is held close to the short-range wireless communication device.

DETAILED DESCRIPTION OF THE INVENTION

Figure 1:
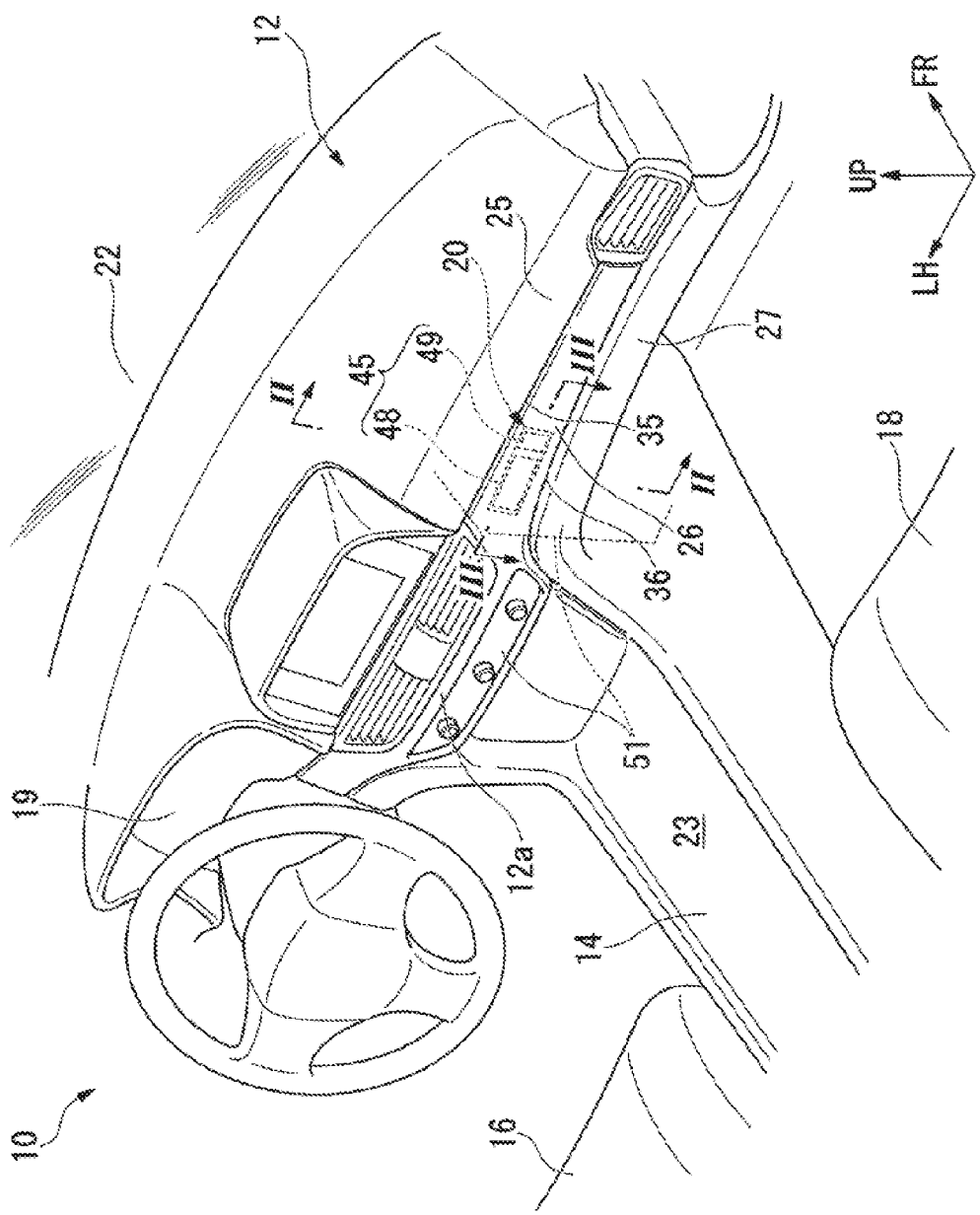
FIG. 1 is a perspective view of a vehicle of an embodiment of the present invention, as viewed from the vehicle compartment side.

Next, an embodiment of the present invention will be described with reference to the drawings. In the drawings, arrow FR indicates the front of the vehicle, arrow UP indicates the upper direction of the vehicle, and arrow LH indicates the left side of the vehicle.

As shown in FIG. 1, a vehicle 10 includes an instrument panel 12, a center console 14, a driver's seat 16, a passenger's seat 18, and a communication system 20.

The instrument panel 12 is provided on the lower side of a front window glass 22, and is arranged between a left front pillar and a right front pillar. That is, the instrument panel 12 is provided on the vehicle front side of a vehicle compartment 23.

Meters 19 that indicate information required for travel of an automobile are arranged on the instrument panel 12 on the driver's seat 16 side. Additionally, a short-range wireless communication device 45 of the communication system 20 is arranged on the instrument panel 12 on the passenger's seat 18 side.

The center console 14 extends toward the vehicle rear from a center 12a in the vehicle width direction of the instrument panel 12. The driver's seat 16 is provided on the left side in the vehicle width direction of the center console 14. The passenger's seat 18 is provided on the right side in the vehicle width direction of the center console 14.

Figure 2:
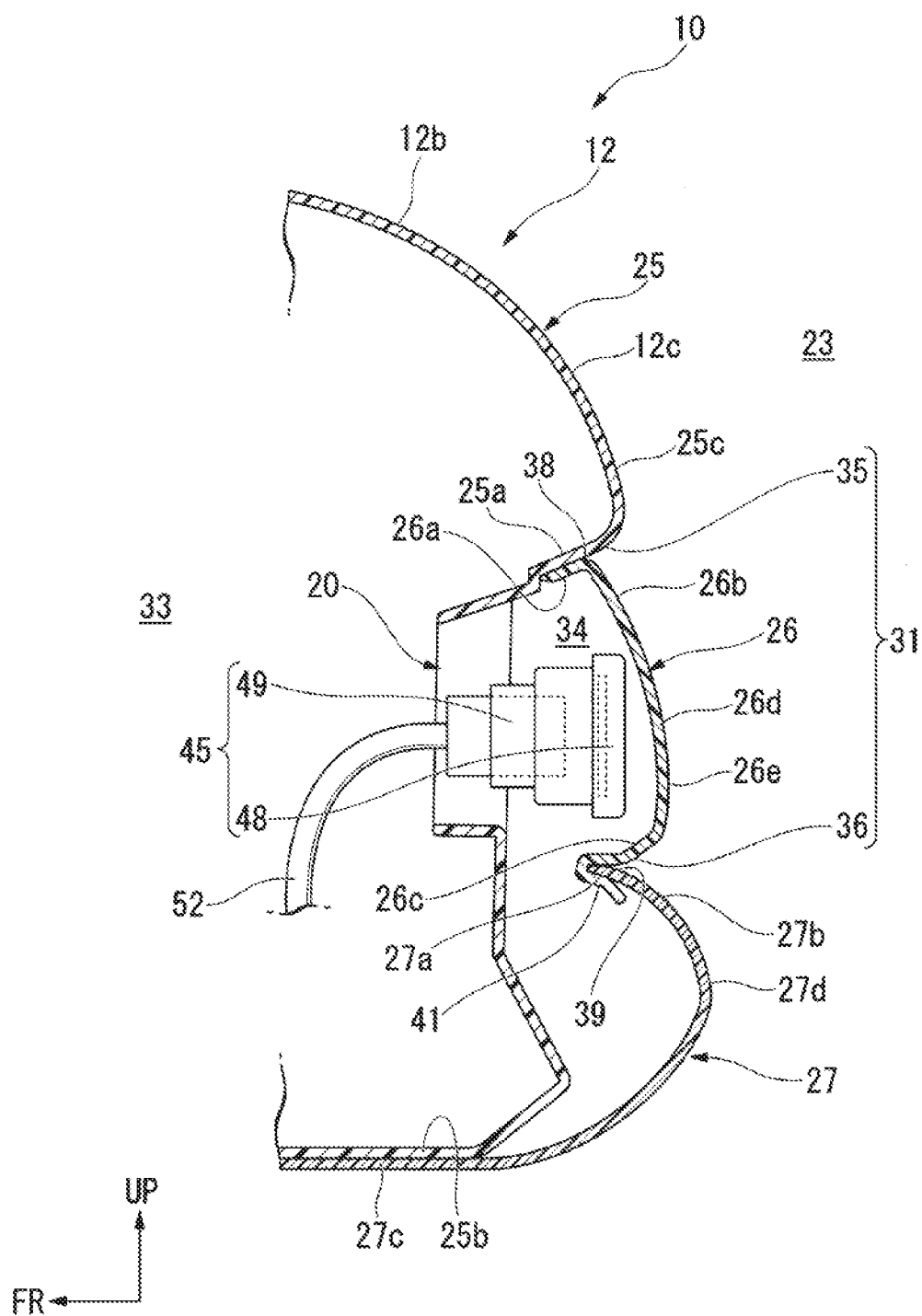
FIG. 2 is a cross-sectional view of an instrument panel of the embodiment of the present invention, taken along line II-II of FIG. 1.

As shown in FIG. 2, the instrument panel 12 is provided with a first instrument panel member 25, a second instrument panel member 26, and a third instrument panel member 27. Groove portions 31 are formed in the instrument panel 12.

The first instrument panel member 25 forms an upper portion 12b of the instrument panel 12, and extends downward through an inner portion 33 of the instrument panel 12.

The second instrument panel member 26 bulges toward the vehicle compartment 23 side. An upper portion 26b of the second instrument panel member 26 is brought into contact with a center step portion 25a of the first instrument panel member 25.

Hence, a first groove portion 35 of the groove portions 31 is formed into a substantially V-shaped recess in cross-section, by the center step portion 25a of the first instrument panel member 25 and the upper portion 26b of the second instrument panel member 26. In other words, the first groove portion 35 is a first border 38 between the first instrument panel member 25 and the second instrument panel member 26, and is formed on a surface 12c of the instrument panel 12.

Additionally, an engaging portion 41 is formed into a substantial U shape in cross-section, in a lower portion 26c of the second instrument panel member 26.

The third instrument panel member 27 is formed into a substantial V shape in cross-section, in such a manner as to bulge toward the vehicle compartment 23 side. An upper edge portion 27a of the third instrument panel member 27 engages with the engaging portion 41 of the second instrument panel member 26 from the vehicle compartment 23 side. Hence, the upper edge portion 27a of the third instrument panel member 27 is brought into contact with the lower portion 26c of the second instrument panel member 26.

Thus, a second groove portion 36 of the groove portions 31 is formed into a substantially V-shaped recess in cross-section, by the lower portion 26c of the second instrument panel member 26 and an upper portion 27b of the third instrument panel member 27. In other words, the second groove portion 36 is a second border 39 between the second instrument panel member 26 and the third instrument panel member 27, and is formed on the surface 12c of the instrument panel 12.

The second groove portion 36 is arranged lower than the first groove portion 35. The first groove portion 35 and the second groove portion 36 form the groove portions 31.

Moreover, a lower portion 27c of the third instrument panel member 27 is brought into contact with a lower portion 25b of the first instrument panel member 25.

By forming the first groove portion 35 and the second groove portion 36 on the instrument panel 12, the shape of the instrument panel 12 becomes complex.

Hence, the instrument panel 12 is separated into three members including the first instrument panel member 25, the second instrument panel member 26, and the third instrument panel member 27. The first border 38 and the second border 39 are formed of the three members 25~27, by assembling the three members 25~27. The first border 38 and the second border 39 are used to form the first groove portion 35 and the second groove portion 36.

Thus, the complex shape of the instrument panel 12 including the first groove portion 35 and the second groove portion 36 can be formed easily.

Referring back to FIG. 1, the first groove portion 35 extends in the vehicle width direction on the passenger's seat 18 side. The second groove portion 36 extends in the vehicle width direction along the first groove portion 35, below the first groove portion 35. The short-range wireless communication device 45 of the communication system 20 is arranged between the first groove portion 35 and the second groove portion 36, and on an inner portion 34 (see FIG. 2) side of the second instrument panel member 26.

Figure 3:
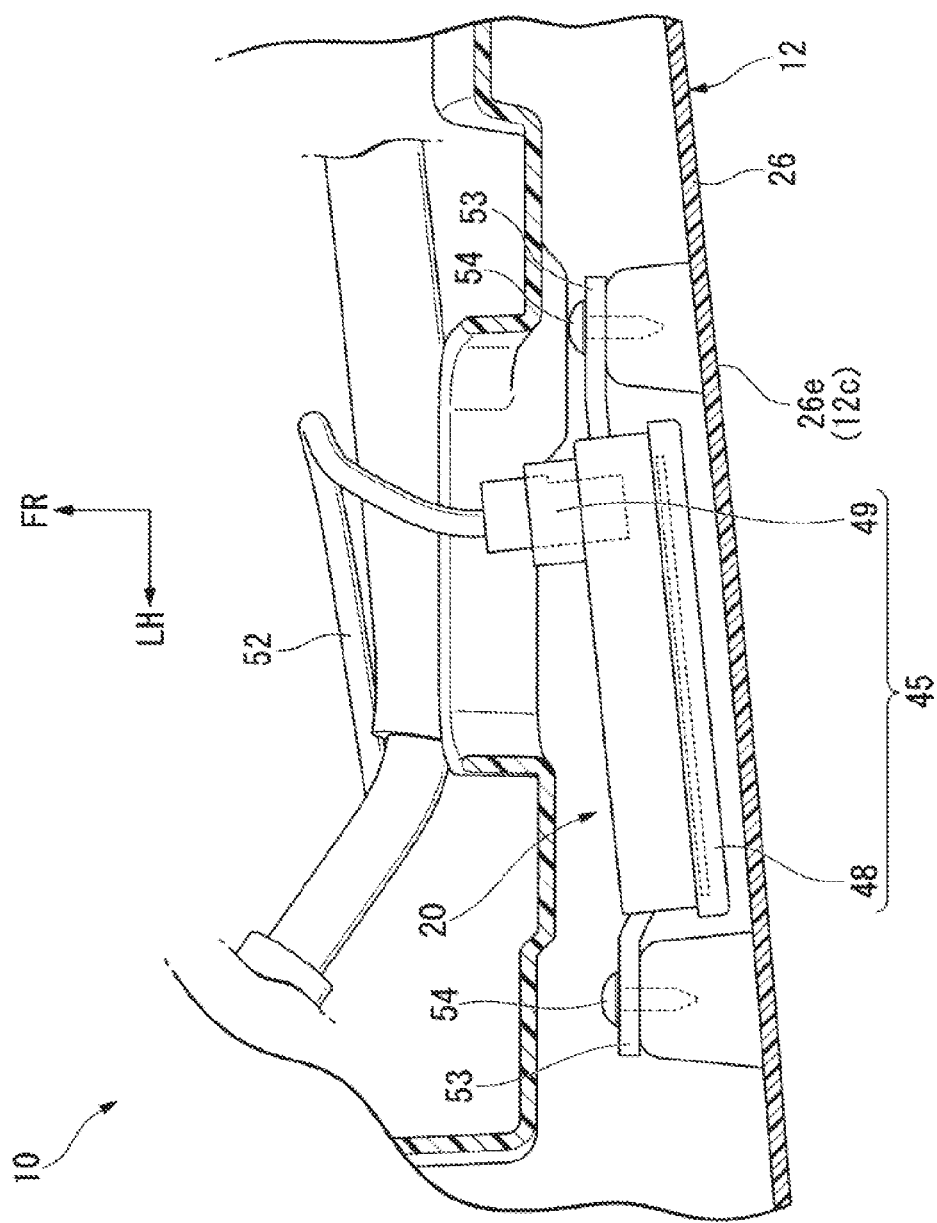
FIG. 3 is a cross-sectional view of a short-range wireless communication device of the embodiment of the present invention, taken along line III-III of FIG. 1.
Figure 4:
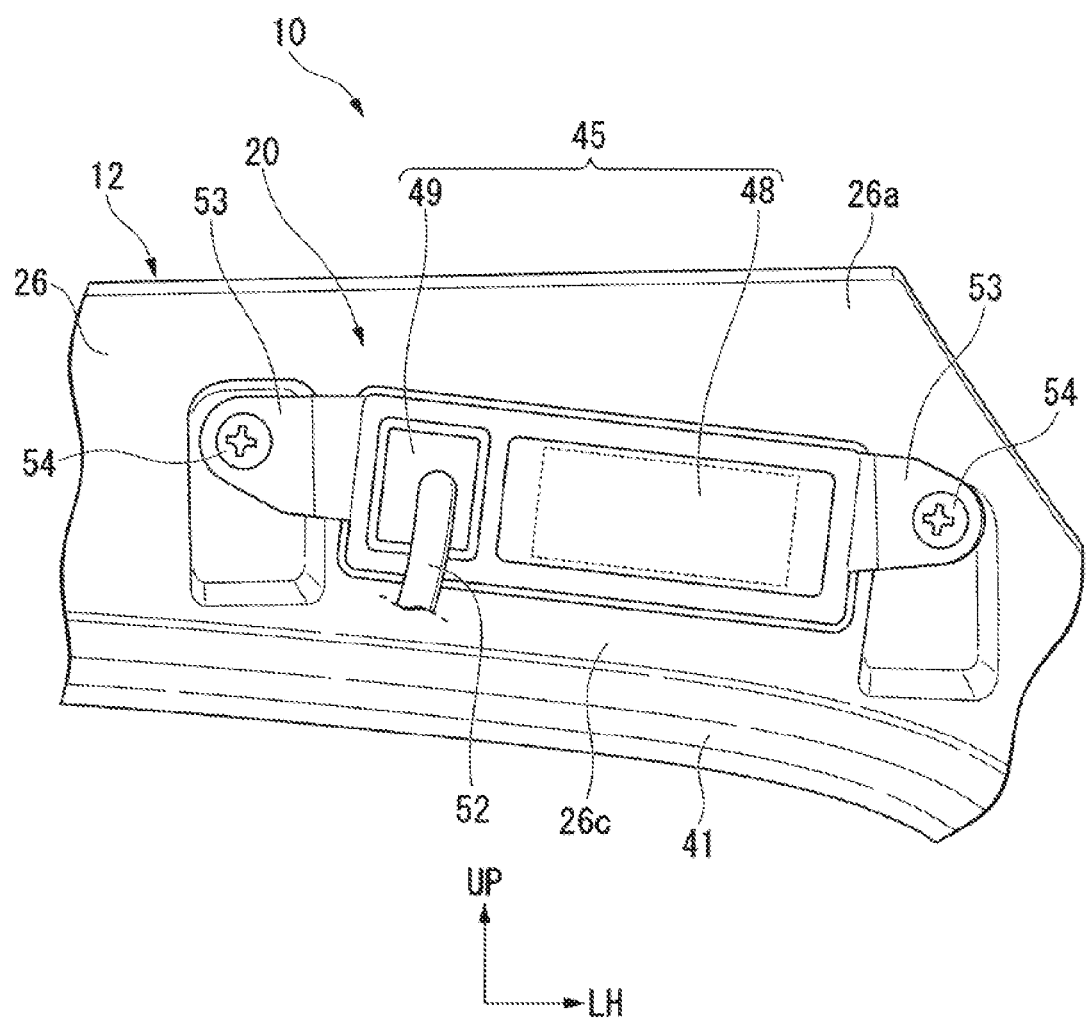
FIG. 4 is a front view of the short-range wireless communication device of the embodiment of the present invention as viewed from the vehicle front side.

As shown in FIGS. 3 and 4, the communication system 20 includes the shore-range wireless communication device 45 installed in the vehicle 10, and a portable communication terminal 46 (see FIG. 5) such as a cellular phone (e.g., smartphone).

The short-range wireless communication device 45 includes a transceiver portion 48 that transmits and receives short-range wireless communication signals, and a connector portion 49 for connecting with an onboard device (onboard equipment) 51 (see FIG. 1) or an unillustrated power source device as an onboard device.

The transceiver portion 48 is an NFC antenna that transmits and receives short-range wireless communication signals, for example.

NFC is an abbreviation for Near Field Communication, and refers to wireless communication within a very short distance such as about 10 centimeters.

Examples of the onboard device (onboard equipment) 51 include a car radio and an air conditioner.

The connector portion 49 is connected to the onboard device 51 with a wire harness 52.

The transceiver portion 48 is formed into a rectangular shape extending in the vehicle width direction in front view. The connection portion 49 is provided on the outside in the vehicle width direction of the transceiver portion 48 (also see FIG. 1). The transceiver portion 48 and the connector portion 49 are formed as one body, and are attached to an attachment bracket 53. The attachment bracket 53 is attached to the second instrument panel member 26 of the instrument panel 12 with fastening members 54.

That is, the transceiver portion 48 and the connector portion 49 are attached to the second instrument panel member 26.

As shown in FIG. 1, the short-range wireless communication device 45 is provided on the passenger's seat 18 side of the vehicle compartment 23. The first groove portion 35 and the second groove portion 36 are arranged substantially parallel to each other in positions in the vicinity of the short-range wireless communication device 45. The first groove portion 35 and the second groove portion 36 are formed in positions vertically sandwiching the short-range wireless communication device 45 (also see FIG. 2).

As shown in FIG. 2, a front upper portion 25c of the first instrument panel member 25, a front center portion 26d of the second instrument panel member 26, and a front bulging portion 27d of the third instrument panel member 27 are arranged substantially flush with one another. Hence, the portable communication terminal 46 (see FIG. 6) of the communication system 20 can be brought into contact with the front upper portion 25c, the front center portion 26d, and the front bulging portion 27d.

Additionally, the short-range wireless communication device 45 of the communication system 20 is arranged on the inner portion 34 side of the second instrument panel member 26, and in the vicinity of a surface 26e of the second instrument panel member 26.

Figure 5:
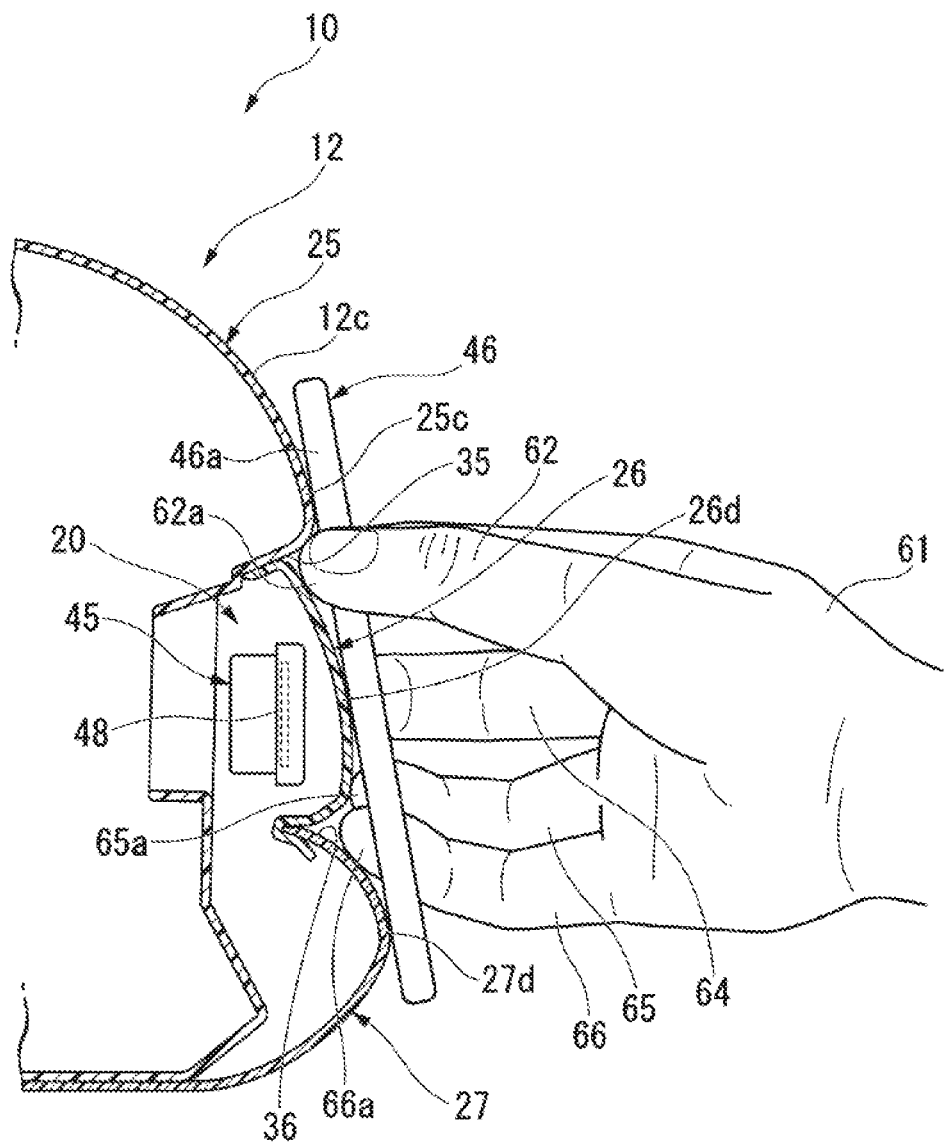
FIG. 5 is a cross-sectional view of the short-range wireless communication device and a portable communication terminal of the embodiment of the present invention, taken along line V-V of FIG. 6.
Figure 6:
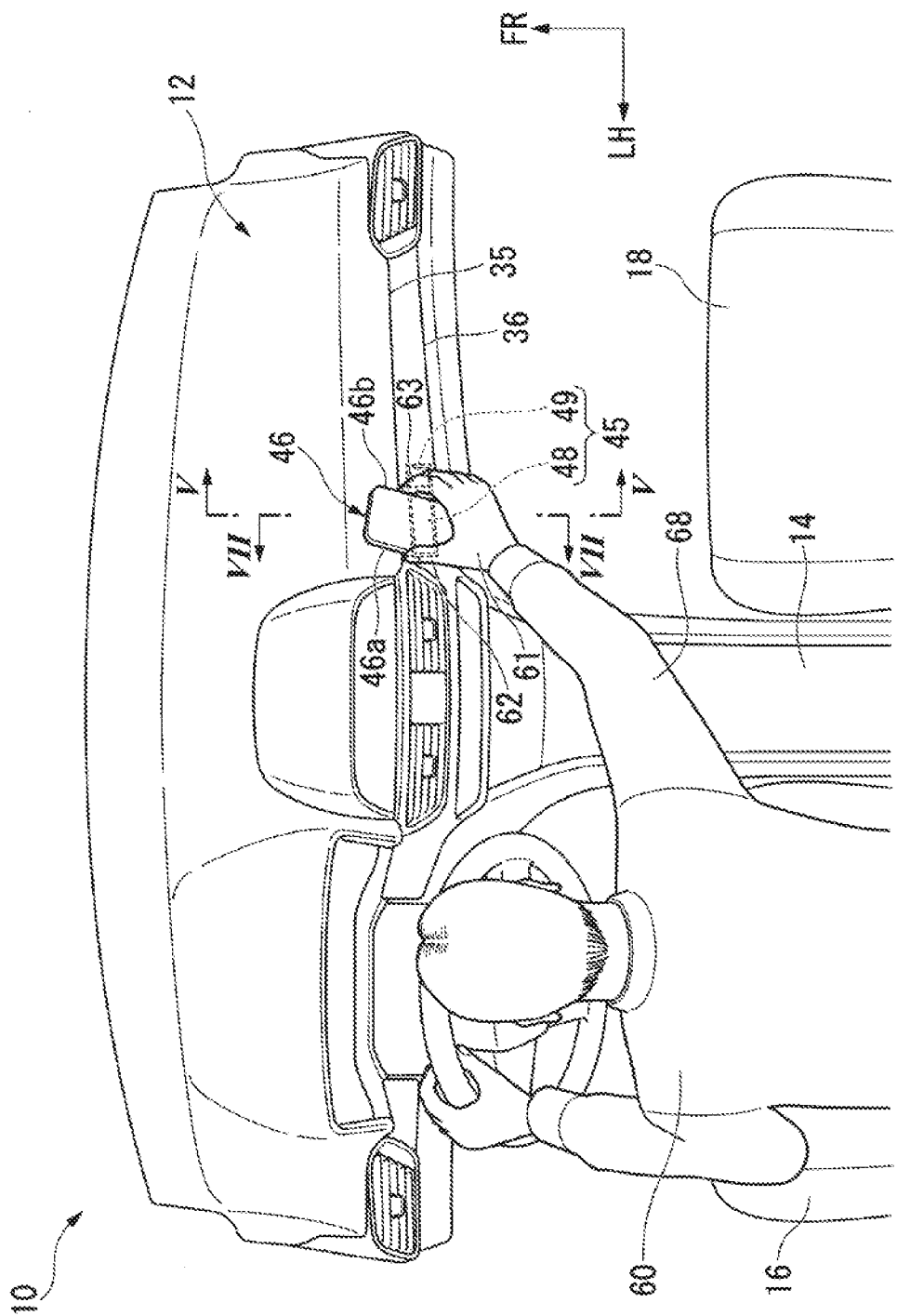
FIG. 6 is a plan view of an example of holding the portable communication terminal close to the short-range wireless communication device of the embodiment of the present invention.

As shown in FIG. 5, by placing the portable communication terminal 46 of the communication system 20 in the front upper portion 25c, the front center portion 26d, and the front bulging portion 27d, the portable communication terminal 46 can be held close to the short-range wireless communication device 45 (specifically, the transceiver portion 48) (see FIG. 6).

Thus, the short-range wireless communication device 45 and the portable communication terminal 46 can be authenticated by short-range wireless communication. This authentication enables pairing (pairing by Bluetooth (registered trademark) communication) of the portable communication terminal 46 and the onboard device 51 (see FIG. 1), and use of favorite radio station settings of a car radio or preferred air-conditioning settings of an air conditioner on the portable communication terminal 46.

As shown in FIG. 6, the transceiver portion 48 is arranged such that it faces the driver's seat 16 side in the vehicle width direction, while the connector portion 49 is arranged such that it faces the passenger's seat 18 side (i.e., opposite side of the driver's seat 16).

Short-range wireless communication can be performed between the transceiver portion 48 of the short-range wireless communication device 45 and the portable communication terminal 46, by using the transceiver portion 48 to transmit and receive short-range wireless communication signals to and from the portable communication terminal 46.

The portable communication terminal 46 is a flat plate-like member, has one edge 46a and the other edge 46b, and is formed into a flat plate shape that is rectangular in plan view.

The transceiver portion 48 is arranged such that it faces the driver's seat 16 side on the right and left in the vehicle width direction. Hence, the transceiver portion 48 is provided in a position favorably spaced apart from the driver's seat 16 (i.e., driver 60). This can prevent the driver 60 from erroneously holding the portable communication terminal 46 in his/her hand 61 close to the transceiver portion 48. That is, it is possible to prevent the driver 60 from erroneously starting authentication.

Figure 7:
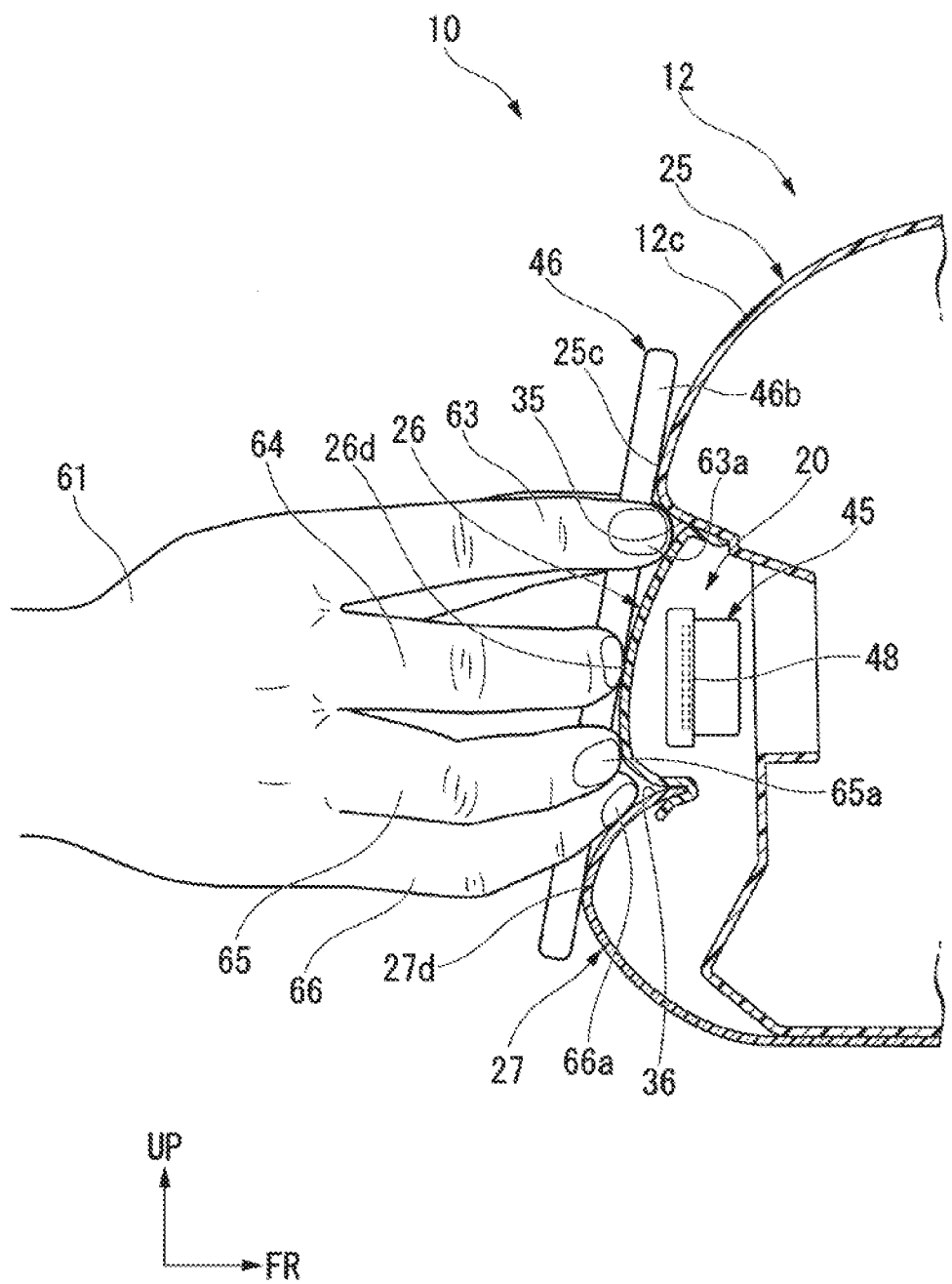
FIG. 7 is a cross-sectional view of the short-range wireless communication device and the portable communication terminal of the embodiment of the present invention, taken along line VII-VII of FIG. 6.

As shown in FIGS. 5 and 7, the first groove portion 35 and the second groove portion 36 are formed in positions in the vicinity of the transceiver portion 48, and on the surface 12c of the instrument panel 12. On the other hand, the portable communication terminal 46 is brought into contact with the front upper portion 25c of the first instrument panel member 25, the front center portion 26d of the second instrument panel member 26, and the front bulging portion 27d of the third instrument panel member 27.

The portable communication terminal 46 can be held close to the transceiver portion 48 with the portable communication terminal 46 in contact with the front upper portion 25c, the front center portion 26d, and the front bulging portion 27d. In this state, fingertips of the hand 61 gripping the portable communication terminal 46 can be inserted into the first groove portion 35 and the second groove portion 36.

To be specific, of the fingertips of the hand 61, fingertips 62a, 63a, 65a, 66a of a thumb 62, an index finger 63, a ring finger 65, and a little finger 66, for example, may be inserted into the first groove portion 35 and the second groove portion 36.

By inserting the fingertips of the hand 61 into the first groove portion 35 and the second groove portion 36, it is possible to hold the portable communication terminal 46 close to the transceiver portion 48 with the fingertips of the hand 61 protruding from the portable communication terminal 46. Hence, the portable communication terminal 46 can be kept firmly gripped by the hand 61, when the portable communication terminal 46 is held close to the transceiver portion 48.

This can keep the portable communication terminal 46 from slipping from the hand 61. Accordingly, the short-range wireless communication device 45 and the portable communication terminal 46 can be authenticated easily by short-range wireless communication.

When holding the portable communication terminal 46 by the hand 61 for authentication, the one edge 46a of the portable communication terminal 46 may be held by the thumb 62, and the other edge 46b may be held by the other fingers 63, 64, 65, 66. In this case, the thumb 62 is located in a relatively high position on the one edge 46a. The index finger 63 is located in a relatively high position on the other edge 46b, while the ring finger 65 and the little finger 66 are located in relatively low positions on the other edge 46b.

Hence, the first groove portion 35 and the second groove portion 36 are formed in positions vertically sandwiching the short-range wireless communication device 45 (i.e., transceiver portion 48). Specifically, the first groove portion 35 is formed on the upper side of the transceiver portion 48, and the second groove portion 36 is formed on the lower side thereof.

Accordingly, when authenticating by holding the portable communication terminal 46 close to the transceiver portion 48, the fingertip 62a of the thumb 62 and the fingertip 63a of the index finger 63 can be inserted into the first groove portion 35. Also, the fingertip 65a of the ring finger 65 and the fingertip 66a of the little finger 66 can be inserted into the second groove portion 36.

Thus, a firm grip of the portable communication terminal 46 can be maintained, and the portable communication terminal 46 can be kept from slipping from the hand.

Referring back to FIG. 6, the second groove portion 36 extends along the first groove portion 35. In other words, the first groove portion 35 and the second groove portion 36 are arranged substantially parallel to each other. Hence, the first groove portion 35 and the second groove portion 36 are formed relatively long. With this, the fingertips of the hand 61 gripping the portable communication terminal 46 can be easily inserted into the first groove portion 35 and the second groove portion 36, when authenticating by holding the portable communication terminal 46 close to the transceiver portion 48.

Furthermore, the transceiver portion 48 of the short-range wireless communication device 45 is directed toward the driver's seat 16 (i.e., driver 60) side. Hence, the transceiver portion 48 is provided in a position favorably close to the driver 60. This allows the driver 60 to easily hold the portable communication terminal 46 close to the transceiver portion 48, without overstretching an arm 68 (i.e., within the shortest possible reach).

Modification

Although the above embodiment describes an example in which the groove portions 31 (first groove portion 35, second groove portion 36) are formed in positions vertically sandwiching the transceiver portion 48, the invention is not limited to this. For example, the groove portions 31 may be formed into a circle or a rectangle by connecting the first groove portion 35 and the second groove portion 36 such that they surround the short-range wireless communication device (i.e., transceiver portion 48 (see FIG. 1)).

By forming the groove portions 31 such that they surround the transceiver portion 48, fingers can be inserted into groove portions when the portable communication terminal 46 is authenticated at an arbitrary angle (specifically, an angle arbitrarily selected from a 360° range). This enables easy authentication of the portable communication terminal 46 at an arbitrary angle, whereby the communication system 20 can be made more useful.

Note that the technical scope of the present invention is not limited to the aforementioned embodiment, and various changes can be made without departing from the gist of the invention.

For example, although the above embodiment describes an example in which the groove portions 31 vertically sandwich the short-range wireless communication device 45, the invention is not limited to this. For example, the groove portions 31 may sandwich the short-range wireless communication device 45 from the right and left.

Also, although the above embodiment describes an example in which the groove portions 31 are formed of the first groove portion 35 and the second groove portion 36, the invention is not limited to this. For example, the groove portions 31 may be formed of more than two groove portions.

Furthermore, although the above embodiment describes an example in which the instrument panel 12 is formed of three members including the first instrument panel member 25, the second instrument panel member 26, and the third instrument panel member 27, the invention is not limited to this.

For example, the instrument panel 12 may be formed of members other than the three members.

Also, although the above embodiment describes an example in which the front upper portion 25c of the first instrument panel member 25, the front center portion 26d of the second instrument panel member 26, and the front bulging portion 27d of the third instrument panel member 27 are arranged substantially flush to one another, the invention is not limited to this.

For example, it is also possible to arrange the front upper portion 25c and the front center portion 26d substantially flush to each other, the front center portion 26d and the front bulging portion 27d substantially flush to each other, and the front upper portion 25c and the front bulging portion 27d substantially flush to each other.

DESCRIPTION OF REFERENCE NUMERALS

10 . . . vehicle
12 . . . instrument panel
. . . 12c surface of instrument panel
16 . . . driver's seat
18 . . . passenger's seat
20 . . . communication system
25 to 27 . . . first to third instrument panel members
31 . . . groove portion
35 . . . first groove portion
36 . . . second groove portion
38, 39 . . . first and second borders (border)
45 . . . short-range wireless communication device
46 . . . portable communication terminal
48 . . . transceiver portion
49 . . . connector portion
51 . . . onboard device

The invention claimed is:

1. A communication system installed in a vehicle, the communication system comprising:
   a short-range wireless communication device provided in a vicinity of a surface of an instrument panel of said vehicle and configured to perform short-range wireless communication with a portable communication terminal which is held by a user in front of the short-range wireless communication device, wherein
   said instrument panel has a groove portion formed on the surface of said instrument panel, which is in a vicinity of said short-range wireless communication device.

2. The communication system according to claim 1, wherein said groove portion is formed in a position sandwiching said short-range wireless communication device.

3. The communication system according to claim 2, wherein said groove portion is formed such that said groove portion surrounds said short-range wireless communication device.

4. The communication system according to claim 2, wherein:
   said groove portion comprises a first groove portion and a second groove portion; and
   said first groove portion and said second groove portion are arranged substantially parallel to each other in the vicinity of said short-range wireless communication device.

5. The communication system according to claim 2, wherein
   said groove portion comprises a first groove portion and a second groove portion,
   said instrument panel comprises at least a first instrument panel member, a second instrument panel member in contact with said first instrument panel member, and a third instrument panel member in contact with said second instrument panel member,
   said first groove portion is formed at a border between said first instrument panel member and said second instrument panel member, and
   said second groove portion is formed at a border between said second instrument panel member and said third instrument panel member.

6. The communication system according to claim 1, wherein
   said short-range wireless communication device is provided on a passenger's seat side in a width direction of said vehicle.

7. The communication system according to claim 6, wherein
   said short-range wireless communication device has a transceiver portion configured to transmit and receive short-range wireless communication signals, and a connector portion configured to connect with an onboard device of said vehicle; and
   said transceiver portion is located at a driver's seat side of said short-range wireless communication device in the width direction of said vehicle, while said connector portion is located at a passenger's seat side of said short-range wireless communication device in the width direction of said vehicle.

8. The communication system according to claim 1, wherein said instrument panel has a first groove portion and a second groove portion which are formed on said surface of said instrument panel, and said short-range wireless communication device is arranged between said first groove portion and said second groove portion and inside said instrument panel.

9. The communication system according to claim 8, wherein said first groove portion and said second groove portion are connected to each other such that said first groove portion and said second groove portion surround said short-range wireless communication device.

* * * * *